April 7, 1925.

D. A. ROGERS 1,532,951

BREAD-TOASTER

Filed June 4, 1923 3 Sheets-Sheet 1

INVENTOR:
DAYTON A. ROGERS.
BY Whiteley and Ruckman
ATTORNEYS.

April 7, 1925.
D. A. ROGERS
1,532,951
BREAD TOASTER
Filed June 4, 1923     3 Sheets-Sheet 2
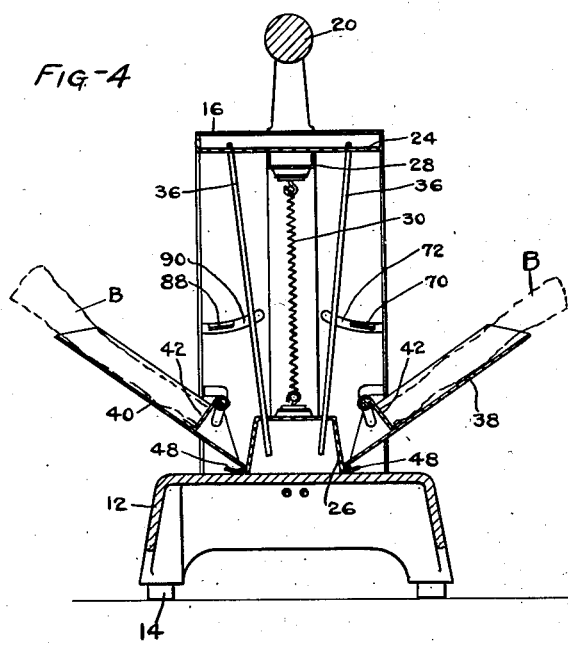
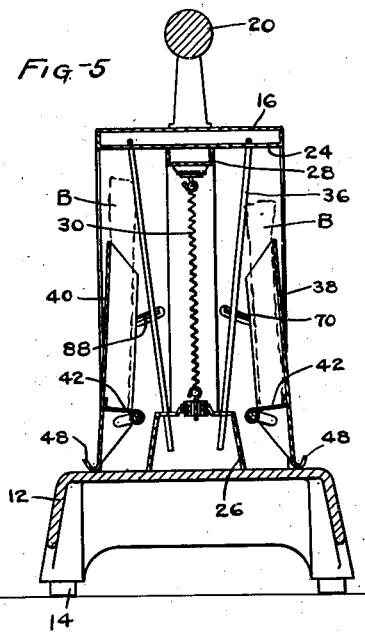
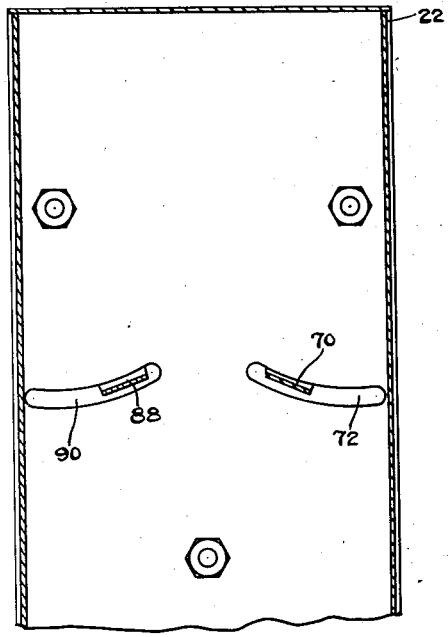
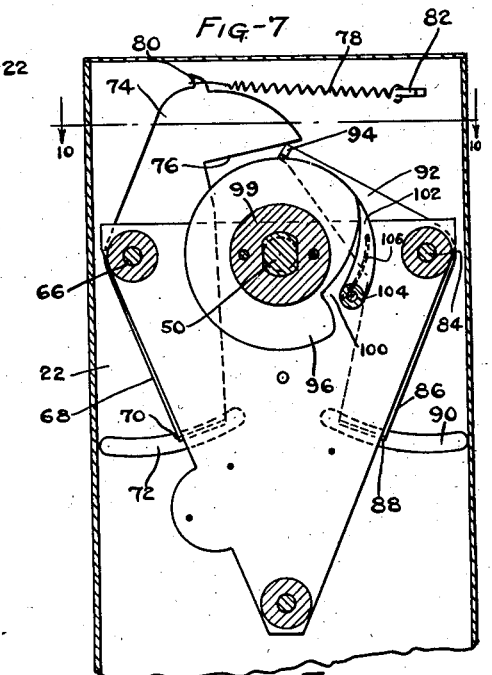
INVENTOR:
DAYTON A. ROGERS.
BY Whiteley and Ruckman
ATTORNEYS.

April 7, 1925.

D. A. ROGERS 1,532,951

BREAD TOASTER

Filed June 4, 1923   3 Sheets-Sheet 3

INVENTOR:
DAYTON A. ROGERS.
BY Whiteley and Ruckman
ATTORNEYS

Patented Apr. 7, 1925.

1,532,951

UNITED STATES PATENT OFFICE.

DAYTON A. ROGERS, OF MINNEAPOLIS, MINNESOTA.

BREAD TOASTER.

Application filed June 4, 1923. Serial No. 643,175.

*To all whom it may concern:*

Be it known that I, DAYTON A. ROGERS, a citizen of the United States, residing at Minneapolis, in the county of Hennepin and State of Minnesota, have invented certain new and useful Improvements in Bread Toasters, of which the following is a specification.

My invention relates to bread toasters, and an object is to provide a device of this character in which the bread may be toasted for a predetermined length of time which may be varied at will, and in which the completed toast will be moved away from the heating means after the toasting operation has been continued for the length of time for which the device has been set. Another object is to provide a device of this character which is economical to manufacture and which is easy to operate.

The full objects of my invention will appear in connection with the detail description, and the novel features of my inventive idea will be particularly pointed out in the claims.

Figure 1:
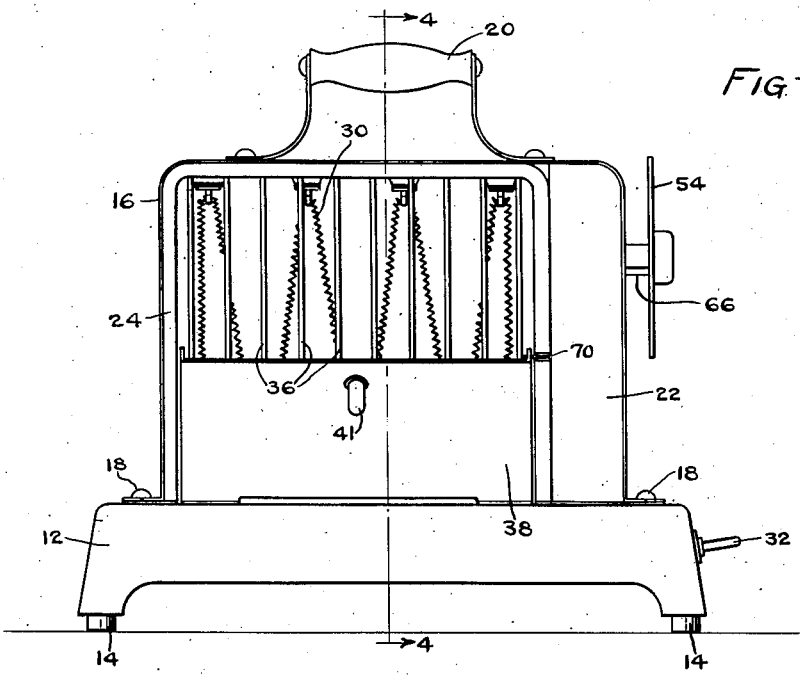
Figure 2:
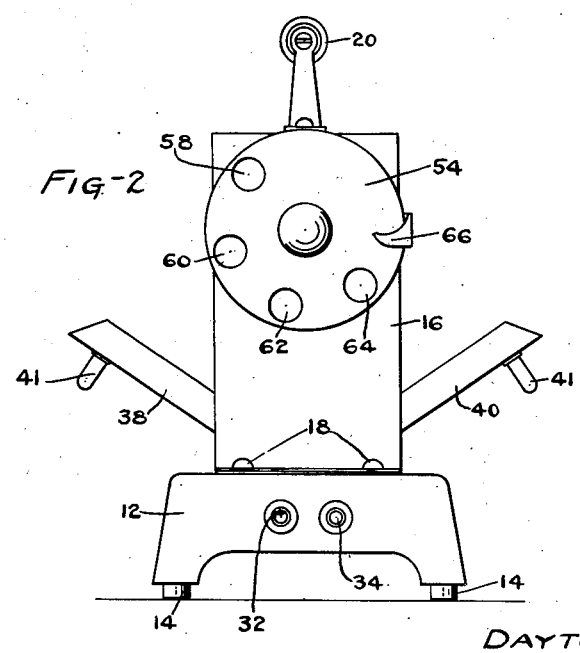
Figure 3:
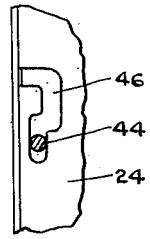
Figure 8:
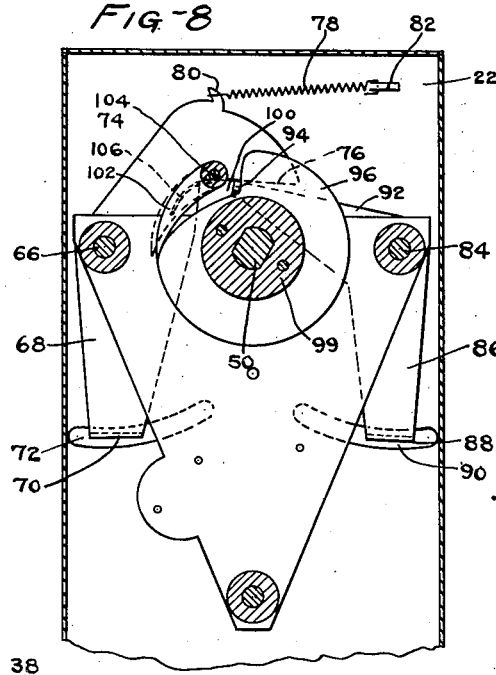
Figure 9:
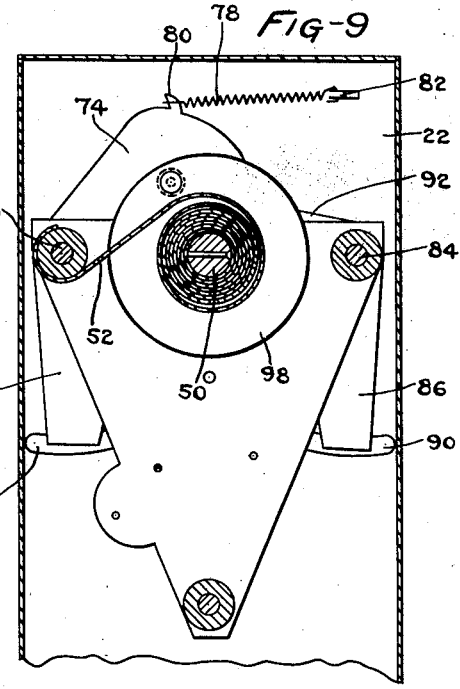
Figure 10:
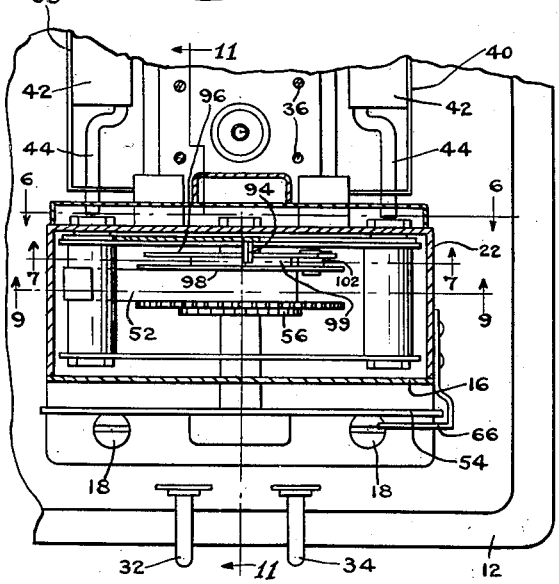
Figure 11:
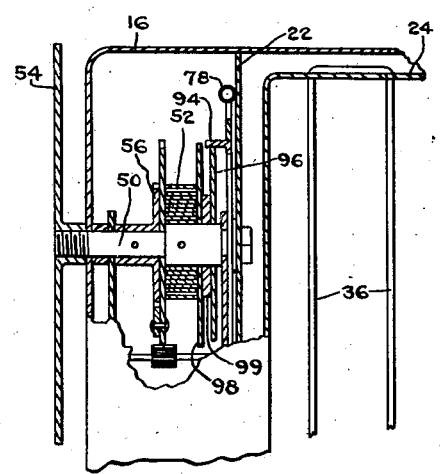

In the accompanying drawings which illustrate one of the forms in which my invention may be embodied,—Fig. 1 is a side elevational view of the toaster. Fig. 2 is a front elevational view showing the device in open position. Fig. 3 is a fragmentary detail view. Fig. 4 is a view in vertical section on the line 4—4 of Fig. 1. Fig. 5 is a view similar to Fig. 4 but showing the device in closed position. Fig. 6 is a view in vertical section on the line 6—6 of Fig. 10. Fig. 7 is a view in vertical section on the line 7—7 of Fig. 10. Fig. 8 is a view similar to Fig. 7 showing some of the parts in another position. Fig. 9 is a view in vertical section on the line 9—9 of Fig. 10. Fig. 10 is a view in horizontal section on the line 10—10 of Fig. 7. Fig. 11 is a view in vertical section on the line 11—11 of Fig. 10.

As shown in the drawings, I provide a base 12 which is supported upon feet 14. An invented U-shaped frame 16 has outturned flanges at its lower ends which are secured to the upper surface of the base by bolts 18. A handle 20 is secured to the horizontal member of the frame so that the device may be easily carried. Mounted within the front portion of the frame is a casing 22 for a clockwork mechanism which will be referred to later. An inverted flanged U-shaped strip 24 extends around within the rear wall of the frame 16, then under the top wall thereof and within the clockwork casing 22 as best shown in Fig. 1. An angular member 26 extends longitudinally of the base above its lower surface and a parallel angular member 28 extends within the horizontal portion of the strip 24. An electrical resistance element which consists of a coiled wire 30 extends back and forth between the members 26 and 28 being attached alternately to these two members. The ends of this resistance element are connected in customary manner with posts 32 and 34 adapted to receive the customary attaching member for supplying electric current from any suitable source of electrical energy. A number of toast-engaging rods 36 are spaced at both sides of the resistance element, these rods being held by the angular member 26 and the horizontal portion of the strip 24. Bread carriers 38 and 40 which are provided with handles 41 are horizontally hinged outside of the rods 36. The inner walls of these carriers near their lower ends are provided with toast-supporting shelves 42 and the free edges of these shelves are bent around rods having offset ends 44 hingedly engaging in slots 46 formed in the strip 24 in the manner shown in Fig. 3 whereby the carriers may be readily attached and detached yet will be swingingly held in place when the device is in operation. Stops 48 on the lower edges of the carriers limit their opening movement to the position shown in Fig. 4. The timing mechanism will now be described. The clock mechanism may be of well known construction, having a main shaft 50 to which is secured one end of a driving spring 52 as shown in Fig. 9. To the forward end of the shaft 50 which extends out through the frame, is secured a dial 54 by means of which the spring may be wound, the customary pawl controlled ratchet wheel 56 permitting the winding operation. The dial is provided with a number of finger-engaging holes 58, 60, 62, and 64 by means of which the dial may be turned in clock-wise direction until the finger of the operator strikes the finger stop member 66 which, as best shown in Fig. 10, is secured to the clockwork casing. The position of the finger holes determines the length of time that the bread will be in toasting position. For instance, the holes 58, 60, 62, and 64 may be indicated respectively for bread which is "Dry," "Medium fresh," "Fresh," and "Extra fresh." Pivotally attached at 66 to one side of the clock casing is a lever 68, the lower end of which is provided with an outstanding lug 70 which extends through an arcuate slot 72 in the casing. The upper end of the lever 68 as best shown in Fig. 7 is provided with a laterally deflected portion 74 having a straight edge 76. A coiled spring 78 has its ends attached to a lug 80 on the lever arm 70 and to a lug 82 on the casing so that this spring tends to hold the lug 70 outwardly in the slot 72 as shown in Figs. 4 and 8. Pivotally attached at 84 to the other side of the clock casing is a lever 86, the lower end of which is provided with an outstanding lug 88 which extends through an arcuate slot 90 in the casing. The upper end of the lever 86 is provided with a laterally deflected portion 92 which, as best shown in Fig. 7, has a forwardly extending lug 94 having sliding engagement with the straight edge 76 formed on the lever 68. The forwardly extending portion of the lug 94 engages the periphery of a camlike disk 96 which is held in spaced relation to a disk 98 by an interposed washer 99, these disks being fixed to the main shaft 50. The disk 96 is provided with a cut-out portion 100 within which is a gate 102 mounted on a pivot 104 carried by the disk 98. The gate 102 is normally held by a spring 106 in the position shown in Fig. 7 so as to form a continuation of the periphery of the disk 96. It will be seen from Figs. 1 and 5 that the lugs 70 and 88 are so positioned as to engage the edges of the carriers 38 and 40 when the latter are in closed position.

The operation and advantages of my invention will now be obvious. Assuming that the carriers 38 and 40 are in open or outward position, slices of bread designated "B" are placed thereon with their lower edges supported by the shelves 42. One of the finger holes in the dial 54 depending upon the length of time it is desired to toast the bread is engaged by the finger of the operator and the disk is turned in clockwise direction for winding the spring 52 until the finger strikes the finger stop 66. The two carriers 38 and 40 are then pushed by hand from the outward position shown in Fig. 4 into the inward position shown in Fig. 5, the slices of bread being prevented from coming into contact with the resistance or heating elements by the rods 36. At the beginning of the winding operation, the lug 94 is in the cut-out portion 100 of the cam disk 96, as shown in Fig. 8. During the winding operation, the cam disk is moved from the position shown in Fig. 8 to a position such as shown in Fig. 7, the exact amount of movement of the disk being, of course, determined by the extent to which the dial is turned. As the disk 96 is turned, the lug 94 slides up the cam portion thereof, the gate 102 being forced open against the tension of the spring 106 to permit passage of the lug after which the gate again closes. As the lug 94 is thus moved outwardly, the levers 68 and 86 are moved into the position shown in Fig. 7. This causes the carrier engaging lugs 70 and 88 to move inwardly into the position shown in Fig. 5 so that when the carriers are pushed inwardly, they will remain in this position during the toasting operation, the clockwork mechanism at this time being operated in reverse direction by the action of the spring 52. The lug 94 during this unwinding operation rides outside of the gate 102 and when it reaches the pivot end of the gate, it is quickly drawn into the cut-out portion 100 of the cam disk. This permits the spring 78 to act upon the levers 68 and 86 and move the lower ends thereof outwardly from the position shown in Fig. 7 into that shown in Fig. 8 whereby the lugs 70 and 88 push the carriers over into unbalanced condition so that they drop into the position shown in Fig. 4. This not only notifies the operator that the toasting operation is completed but brings the toast sufficiently away from the heating elements so that the toast will not be burned even if allowed to remain in this position. The operator turns the slices and causes the toasting operation to be repeated on the opposite sides thereof. The length of time of the toasting operation is determined by the operator according to the amount which he turns the dial to wind the device. It will be understood that a less time will be required for dry bread than for moist or fresh bread. When the toasting operation has been completed, the device stops in its initial position on account of the lug 94 engaging the shoulder at the side of the cut-out portion of the cam disk 96, as shown in Fig. 8.

I claim:

1. A bread toaster comprising a support, heating means carried by said support, a number of toast-engaging elements supported adjacent said heating means, means for holding bread against said elements, and means for causing said bread-holding means to move away bodily from said heating means when the toasting operation has been continued for a predetermined length of time.

2. A bread toaster comprising a support, heating means carried by said support, a bread carrier pivoted to said support and adapted to hold bread in toasting position, timing mechanism, and means operated by said timing mechanism for causing said carrier to swing outwardly away from said heating means when the toasting operation has been continued for a predetermined length of time.

3. A bread toaster comprising a support, heating means carried by said support, means adapted to hold bread in toasting position, clockwork mechanism having a shaft, a dial secured to said shaft, means whereby said dial may be turned varying amounts, and means operated by said clockwork mechanism for causing said bread-holding means to move away from said heating means when the toasting operation has been continued for a period determined by the extent to which said dial was turned.

4. A bread toaster comprising a support, heating means carried by said support, a bread carrier adapted to hold bread in toasting position, clockwork mechanism having a main shaft, a dial secured to said shaft and having a number of finger holes therein whereby the dial may be turned varying amounts, a finger stop member for limiting the turning movement of said dial, and means operated by said clockwork mechanism for causing said carrier to move away from said heating means when the toasting operation has been continued for a period determined by the extent to which said dial was turned.

5. A bread toaster comprising a support, heating means carried by said support, a bread carrier pivoted at its lower end to said support and adapted to hold bread in toasting position, clockwork mechanism having a main shaft, a dial secured to said shaft and having a number of finger holes therein whereby the dial may be turned varying amounts, a finger stop member for limiting the timing movement of said dial, and carrier-engaging means operated by said clockwork mechanism for causing said carrier to swing outwardly away from said heating means when the toasting operation has been continued for a period determined by the extent to which said dial was turned.

6. A bread toaster comprising a support, heating means carried by said support, bread carriers pivoted at their lower ends to said support on opposite sides of said heating means and adapted to hold bread in toasting position, clockwork mechanism having a main shaft, a dial secured to said shaft and having a number of finger holes therein whereby the dial may be turned varying amounts, a finger stop member for limiting the timing movement of said dial, a cam disk fixed to said shaft, a second disk fixed to said shaft, a gate pivoted to said second disk and lying in the depressed portion of said cam disk, a pivoted lever, a lug on one end of said lever engaging said cam disk and adapted to pass under said gate when said dial is turned to wind said clockwork mechanism and to pass over said gate when said clockwork mechanism unwinds, a second pivoted lever having one of its ends in engagement with said lug on the side thereof which is opposite to that which engages said cam disk, a spring holding said second lever with said lug in engaging position, and carrier engaging lugs on the other ends of both of said levers which swings said carriers away from said heating means when said clockwork mechanism unwinds into initial position.

In testimony whereof I hereunto affix my signature.

DAYTON A. ROGERS.